(12) United States Patent
Kamp et al.

(10) Patent No.: US 8,959,927 B2
(45) Date of Patent: Feb. 24, 2015

(54) PITOT TUBE WITH INCREASED PARTICLE SEPARATION FOR A COMPRESSOR BLEED SYSTEM OF A GAS TURBINE ENGINE

(75) Inventors: Josh Kamp, Glastonbury, CT (US); Kevin Arthur Roberg, Norwich, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 1044 days.

(21) Appl. No.: 13/017,146

(22) Filed: Jan. 31, 2011

(65) Prior Publication Data

US 2012/0192569 A1   Aug. 2, 2012

(51) Int. Cl.
| | | |
|---|---|---|
| *F16K 31/163* | (2006.01) | |
| *F16K 1/22* | (2006.01) | |
| *G05D 16/20* | (2006.01) | |
| *B64D 13/02* | (2006.01) | |
| *F16K 37/00* | (2006.01) | |

(52) U.S. Cl.
CPC ............ *G05D 16/2093* (2013.01); *B64D 13/02* (2013.01); *F16K 31/1635* (2013.01); *F16K 37/005* (2013.01); *F16K 1/221* (2013.01)
USPC ............. 60/785; 60/795; 137/489; 73/861.65

(58) Field of Classification Search
CPC .... G05D 16/2093; B64D 13/02; F16K 1/221; F16K 37/005; F16K 31/1635
USPC ............ 60/782, 785, 795, 806; 137/488, 489; 73/861.65
See application file for complete search history.

(56) References Cited

U.S. PATENT DOCUMENTS

| | | | | |
|---|---|---|---|---|
| 1,940,921 | A | * 12/1933 | Smith, Jr. ................... | 73/861.49 |
| 2,706,409 | A | *  4/1955 | Preston ...................... | 73/861.67 |
| 3,086,548 | A |    4/1963 | Galiger et al. | |
| 3,444,875 | A |    5/1969 | Furlong et al. | |
| 3,945,565 | A | *  3/1976 | Lynch et al. ................. | 236/49.4 |
| 4,506,594 | A |    3/1985 | Rowland et al. | |
| 4,705,065 | A | * 11/1987 | McNeely et al. .......... | 137/484.6 |
| 4,717,159 | A |    1/1988 | Alston et al. | |
| 4,796,651 | A | *  1/1989 | Ginn et al. ......................... | 137/8 |
| 4,872,807 | A |   10/1989 | Thompson | |
| 5,073,147 | A | * 12/1991 | Takano et al. ................... | 474/28 |
| 5,365,795 | A | * 11/1994 | Brower, Jr. ................. | 73/861.65 |
| 5,472,014 | A | * 12/1995 | Carlson ......................... | 137/556 |
| 5,693,125 | A |   12/1997 | Dean | |
| 5,938,147 | A |    8/1999 | DeGroff | |
| 5,997,243 | A |   12/1999 | Shaw | |
| 6,164,143 | A |   12/2000 | Evans | |

(Continued)

OTHER PUBLICATIONS

The extended European Search Report in counterpart European Application No. 11195843.5 filed Dec. 28, 2011.

*Primary Examiner* — William H Rodriguez
*Assistant Examiner* — Carlos A Rivera
(74) *Attorney, Agent, or Firm* — Kinney & Lange, P.A.

(57) ABSTRACT

A pneumatically actuated valve includes a valve body, a pneumatic actuator, and a pitot tube. The valve body includes a valve disc positioned in a valve housing that defines a flow passage with a flow passage diameter. The pneumatic actuator rotates the valve disc in the valve housing. The pitot tube is connected to the pneumatic actuator and has a tip extending into the flow passage. The tip is spaced apart from the valve housing by at least 1/20 of the flow passage diameter. The tip is substantially free of downstream obstructions for a distance equal to at least 1/2 of the flow passage diameter when the valve is in an open position.

17 Claims, 3 Drawing Sheets

(56) References Cited

U.S. PATENT DOCUMENTS

| | | |
|---|---|---|
| 6,892,745 B2 * | 5/2005 | Benson .............................. 137/1 |
| 7,153,346 B2 * | 12/2006 | Ball et al. ........................ 96/413 |
| 7,155,968 B2 | 1/2007 | Collot et al. |
| 2004/0000656 A1 | 1/2004 | Wiggins et al. |
| 2008/0000531 A1 | 1/2008 | Robb et al. |
| 2012/0103108 A1 * | 5/2012 | Kamp et al. ............... 73/861.65 |

* cited by examiner

PITOT TUBE WITH INCREASED PARTICLE SEPARATION FOR A COMPRESSOR BLEED SYSTEM OF A GAS TURBINE ENGINE

BACKGROUND

The present invention relates to valves, and in particular, to a pneumatically actuated valve that uses a pitot tube.

In many gas turbine engines, a bleed system is used that bleeds gas off a compressor section to be used for various purposes. Such bleed systems typically have one or more valves that control flow of gas through the bleed system. Some valves include a pitot tube positioned on an upstream side of the valve and operate using air from the pitot tube. When the valve detects a downstream pressure that is beyond a threshold, pitot tube air is used to partially close the valve to reduce pressure downstream of the valve. Alternatively when the downstream pressure is below a threshold, pitot tube air is used to partially open the valve to increase pressure downstream of the valve.

Gas bled from a compressor section typically includes various particles, such as engine oil, in addition to air. Such particles can pass through a pitot tube and undesirably contaminate internal systems of the valve, such as its torque motor or solenoid, filter, seal rings, and/or flow passages. If enough contaminating particles enter the pitot tube, the resulting contamination can cause the bleed valve to fail, requiring time-consuming and expensive repair or replacement of the torque motor and/or the entire valve.

SUMMARY

According to the present invention, a pneumatically actuated valve includes a valve body, a pneumatic actuator, and a pitot tube. The valve body includes a valve disc positioned in a valve housing that defines a flow passage with a flow passage diameter. The pneumatic actuator rotates the valve disc in the valve housing. The pitot tube is connected to the pneumatic actuator and has a tip extending into the flow passage. The tip is spaced apart from the valve housing by at least 1/20 of the flow passage diameter. The tip is substantially free of downstream obstructions for a distance equal to at least 1/2 of the flow passage diameter when the valve is in an open position.

Another embodiment is a bleed system for a gas turbine engine that includes a bleed passage and a valve body. The bleed passage is connected to a compressor section of the gas turbine engine. The bleed valve is connected to the bleed passage and includes a valve body, a pneumatic actuator, and a pitot tube. The valve body includes a valve housing defining a flow passage having a flow passage diameter, a valve disc positioned in the valve housing, and a shaft connected to the valve disc. The pneumatic actuator is connected to the shaft for rotating the valve disc in the valve housing. The pitot tube is connected to the pneumatic actuator and has a tip extending into the flow passage of the valve housing. The tip is spaced apart from the valve housing by at least 1/20 of the flow passage diameter. The tip is substantially free of downstream obstructions for a distance equal to at least 1/2 of the flow passage diameter when the valve is in an open position.

Another embodiment is a bleed system for a gas turbine engine that includes a bleed passage and a valve body. The bleed passage is connected to a compressor section of the gas turbine engine. The bleed valve is connected to the bleed passage and includes a valve body, a pneumatic actuator, and a pitot tube. The valve body includes a valve housing defining a flow passage, a valve disc positioned in the valve housing, and a shaft connected to the valve disc. The pneumatic actuator is connected to the shaft for rotating the valve disc in the valve housing. The pitot tube is connected to the pneumatic actuator and has a tip positioned in a portion of the flow passage with a substantially highest velocity flow stream.

Another embodiment is a method for operating a bleed valve. The method includes flowing bleed air from a compressor section of a gas turbine engine through a bleed passage and controlling flow through the bleed passage via a bleed valve having a pneumatic actuator. The method further includes supplying air to the pneumatic actuator via a pitot tube extending into a flow passage of the bleed valve, wherein a tip of the pitot tube is positioned in a portion of the flow passage with a substantially highest velocity flow stream.

Another embodiment is a method for configuring a bleed valve having a flow passage to receive bleed air from a compressor section of a gas turbine engine. The method includes connecting a pitot tube to a pneumatic actuator of the bleed valve and positioning a tip of the pitot tube in a portion of the flow passage with a substantially highest velocity flow stream.

DETAILED DESCRIPTION

Figure 1:
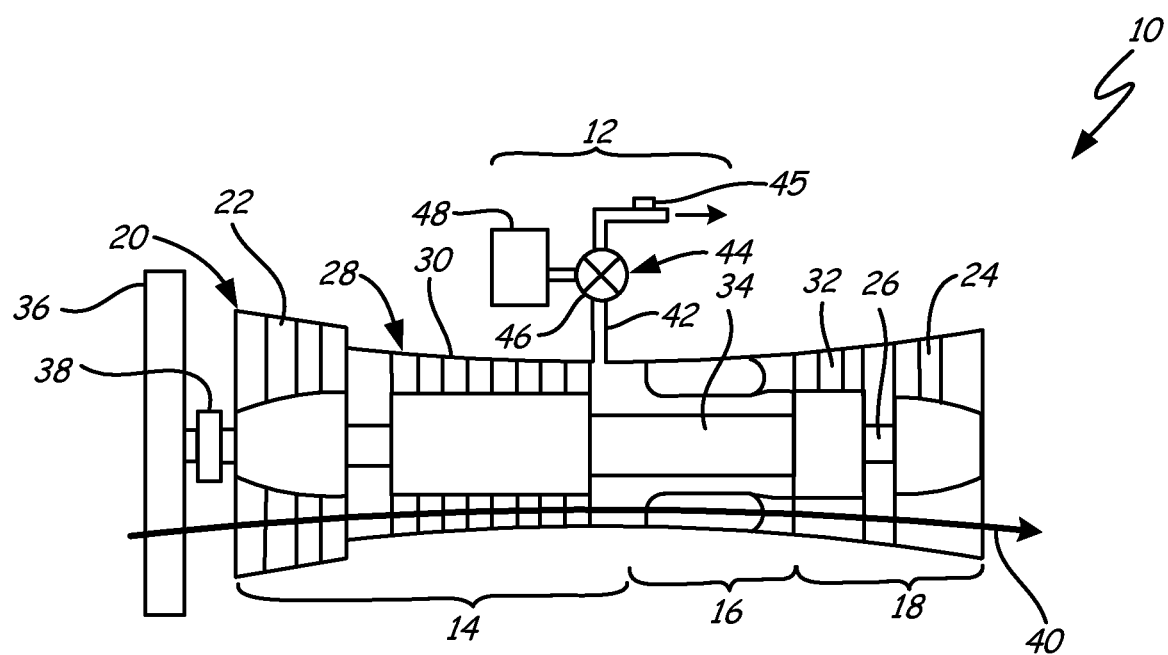
FIG. 1 is a schematic side view of a gas turbine engine having a bleed system.

FIG. 1 is a schematic side view of gas turbine engine 10 having bleed system 12. Gas turbine engine 10 includes compressor section 14, combustor section 16, and turbine section 18. Low pressure spool 20 (which includes low pressure compressor 22 and low pressure turbine 24 connected by low pressure shaft 26) and high pressure spool 28 (which includes high pressure compressor 30 and high pressure turbine 32 connected by high pressure shaft 34) each extend from compressor section 14 to turbine section 18. Propulsion fan 36 is connected to and driven by low pressure spool 20. A fan drive gear system 38 may be included between the propulsion fan 36 and low pressure spool 20. Air flows from compressor section 14 to turbine section 18 along engine gas flow path 40. The general construction and operation of gas turbine engines is well-known in the art, and therefore detailed discussion here is unnecessary.

Bleed system 12 includes bleed passage 42, bleed valve 44, and pressure sensor 45. Bleed passage 42 fluidically connects compressor section 14 to various components that use bleed air, such as turbine section 18 for cooling and other aircraft components (not shown). Bleed valve 44 is a flow control valve that includes valve body 46 and pneumatic actuator 48. Bleed valve 44 controls fluid flow through bleed passage 42, as further explained with respect to FIG. 2, based upon pressure sensed by pressure sensor 45 downstream of bleed valve 44.

Figure 2:
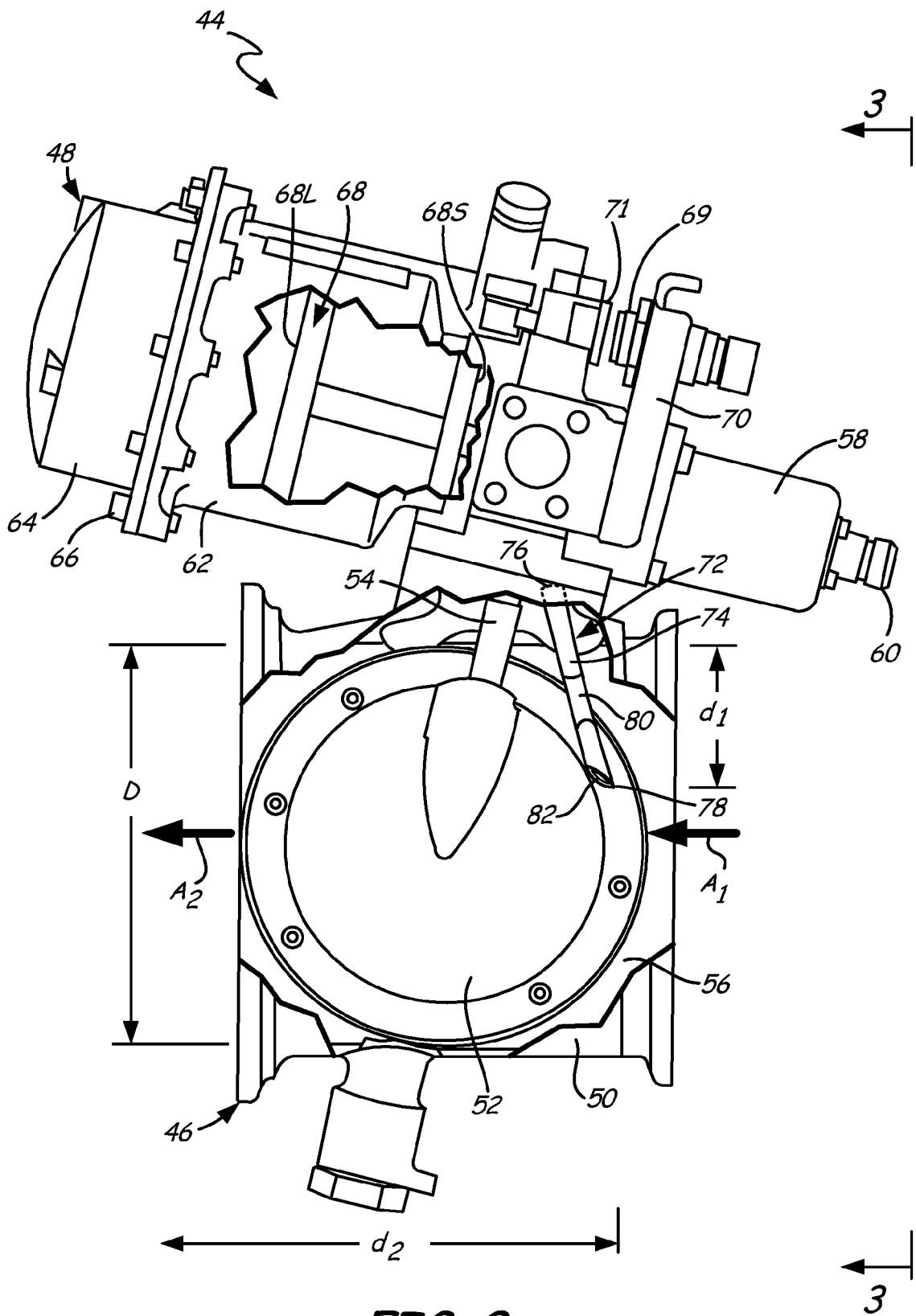
FIG. 2 is a side view of a bleed valve used in the bleed system of FIG. 1.

FIG. 2 is a side view of bleed valve 44. Valve body 46 includes valve housing 50, valve disc 52, and shaft 54. Valve housing 50 defines flow passage 56 having flow passage diameter D. In the illustrated embodiment, bleed valve 44 is a butterfly valve. Valve disc 52 is positioned in valve housing 50 and is connected to shaft 54. Valve disc 52 can pivot about shaft 54 to selectively allow or restrict flow through flow passage 56. Valve disc 52 is pivotable between a substantially open position (as shown in FIG. 2) and a substantially closed position (not shown). Shaft 54 extends to and is connected to pneumatic actuator 48.

Pneumatic actuator 48 includes torque motor 58 (which includes electrical connection 60) and actuator housing 62 connected to actuator cover 64 via fasteners 66 to contain piston 68. Actuator housing 62 is also connected to valve housing 50. A portion of actuator housing 62 is cut-away to show piston 68. Piston 68 has small side 68S and large side 68L. Piston 68 is attached to shaft 54 such that shaft 54 and valve disc 52 rotate in response to movement by piston 68. Proximity switch 69 is mounted on bracket 70, which is mounted to actuator housing 62. Switch paddle 71 is connected to and rotates with shaft 54. Switch paddle 71 is positioned with respect to proximity switch 69 such that proximity switch 69 can sense distance from switch paddle 71 as switch paddle 71 moves with the rotation of shaft 54. This allows pneumatic actuator 48 to determine angular position of shaft 54, and consequently, angular position of valve disc 52.

Pitot tube 72 has tube body 74 with connection end 76 and tip 78. Connection end 76 connects to pneumatic actuator 68. Tip 78 extends away from pneumatic actuator 68 and is spaced apart from valve housing 50 by a distance $d_1$. Tube body 74 has bent portion 80 such that pitot tube 72 bends substantially away from valve disc 52 when valve disc 52 is in an open position. Tip 78 of pitot tube 72 has inlet orifice 82 angled toward a downstream flow direction. Flow arrows $A_1$ and $A_2$ illustrate flow direction through flow passage 56. Inlet orifice 82 has a substantially elliptical shape facing the downstream flow direction.

Torque motor 58 actuates piston 68 (and consequently actuates valve disc 52) based upon pressure sensed via pressure sensor 45 (shown in FIG. 1). In the illustrated embodiment, gas from flow passage 56 enters pitot tube 72 and is supplied both to large side 68L and to small side 68S of piston 68. Gas is supplied to large side 68L such that pressure on large side 68L is substantially the same as that at tip 78 of pitot tube 72. Torque motor 58 actuates a small servo valve (not shown) to add gas to small side 68S to selectively increase or decrease pressure at small side 68S. Piston 68 moves within actuator housing 62 based upon the pressure difference between large side 68L and small side 68S. Thus, to open bleed valve 44, torque motor 58 can increase pressure at small side 68S of piston 68 to move piston 68. To close bleed valve 44, torque motor 58 can decrease pressure at small side 68S. Torque motor 58 receives power through electrical connection 60 from an aircraft electrical system (not shown). Pneumatic actuator 48 can rotate valve disc 52 to be substantially open, substantially closed, or anywhere in between.

Gas flowing from compressor section 14 through bleed passage 42 typically includes mostly compressed air, but can also include various contaminating particles. If contaminating particles flow through pitot tube 72 and into pneumatic actuator 48, such particles can accumulate and contaminate torque motor 58, causing torque motor 58 to malfunction. Inlet orifice 82 of pitot tube 72 is angled to face downstream so as to reduce flow of particles through inlet orifice 82, but to allow air flow through inlet orifice 82.

Despite the angling of orifice 82, it has been discovered that certain particles, particularly those particles having a diameter of about 5 microns, can still undesirably enter pitot tube 72 if tip 78 is not properly positioned. Particles having a diameter of about 5 microns tend to be particularly sticky, and thus, particularly contaminating to small orifices (not shown) in torque motor 58. Contamination by such particles can be reduced by extending pitot tube 72 away from valve housing 50 by a suitable distance $d_1$ that is at least 1/20 of flow passage diameter D. In an alternative embodiment, tip 78 can be spaced apart from valve housing 50 by a distance $d_1$ that is at least 1/10 of flow passage diameter D to further reduce particle contamination. In the illustrated embodiment, distance $d_1$ is about 1/3 of flow passage diameter D.

Contamination by such particles can also be reduced by positioning tip 78 such that tip 78 is substantially free of downstream obstructions for a distance $d_2$ equal to at least 1/2 of flow passage diameter D. By bending pitot tube 72, tip 78 can be positioned substantially upstream of valve disc 52 when valve disc 52 is in a closed position, yet positioned such that valve disc 52 does not present a downstream obstruction to tip 78 when valve disc 52 is in an open position (also illustrated in FIG. 3). In an alternative embodiment, tip 78 can be substantially free of downstream obstructions by a distance $d_2$ equal to at least three times flow passage diameter D when valve disc 52 is in an open position to further reduce particle contamination. In another alternative embodiment, tip 78 can be substantially free of downstream obstructions by a distance $d_2$ equal to at least ten times flow passage diameter D when valve disc 52 is in an open position to still further reduce particle contamination. Bleed passage 42 can be designed such that, when combined with bleed valve 44, tip 78 is substantially free of downstream obstructions for extended distances $d_2$.

Thus, by extending pitot tube 72 away from valve housing 50 by a suitable distance $d_1$ and by bending pitot tube 72 away from valve disc 52, tip 78 can be positioned in a portion of flow passage 56 with a relatively high velocity flow stream so that intake of contaminating particles is limited. In the illustrated embodiment, tip 78 is positioned in a portion of flow passage 56 with a substantially highest velocity flow stream.

Figure 3:
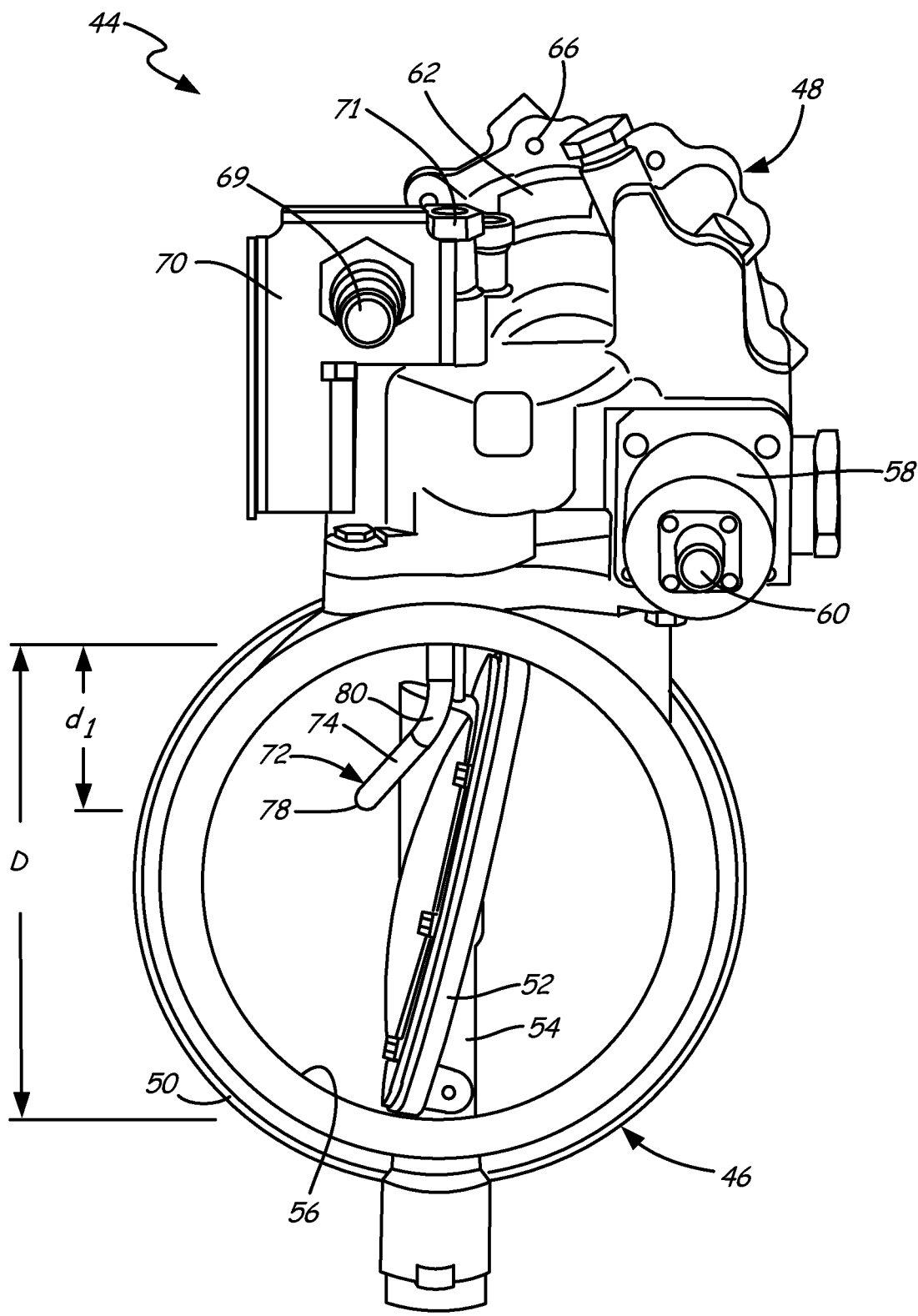
FIG. 3 is a front view of the bleed valve viewed along line 3-3 of FIG. 2.

FIG. 3 is a front view of bleed valve 44, viewed along line 3-3 of FIG. 2. FIG. 3 better illustrates how bent portion 80 causes pitot tube 72 to bend substantially away from valve disc 52 when valve disc 52 is in the illustrated open position. This positions tip 78 to the side of valve disc 52, such that tip 78 is substantially free of downstream obstructions caused by valve disc 52 and/or shaft 54.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, though one embodiment includes a bleed valve used in a bleed system of a gas turbine engine, in other embodiments the invention could be used in other systems that benefit from a valve having a pitot tube of the present invention. Similarly, the exact construction of a pneumatic actuator and a valve body can vary so long as a pitot tube of the present invention is included.

The invention claimed is:

1. A pneumatically actuated valve comprising:
   a valve body comprising:
      a valve housing defining a flow passage having a flow passage diameter; and
      a valve disc positioned in the valve housing;
   a pneumatic actuator for rotating the valve disc in the valve housing; and
   a pitot tube connected to the pneumatic actuator and having a tip extending into the flow passage of the valve housing upstream of the valve disc, wherein the tip has an inlet orifice angled toward a downstream flow direction and is spaced apart from the valve housing by at least 1/20 of the flow passage diameter, and wherein the pitot tube has a body bent away from the valve disc so that the tip is radially offset from the valve disc when the valve disc is in an open position, and is configured so that the tip is substantially free of downstream obstructions for a distance equal to at least 1/2 of the flow passage diameter when the valve disc is in the open position.

2. The pneumatically actuated valve of claim 1, wherein the tip is substantially free of downstream obstructions for a distance equal to at least three times the flow passage diameter when the valve disc is in an open position.

3. The pneumatically actuated valve of claim 1, wherein the tip is substantially free of downstream obstructions for a distance equal to at least ten times the flow passage diameter when the valve disc is in an open position.

4. The pneumatically actuated valve of claim 1, wherein the tip is spaced apart from the valve housing by at least 1/10 of the flow passage diameter.

5. The pneumatically actuated valve of claim 1, wherein the inlet orifice has a substantially elliptical shape.

6. The pneumatically actuated valve of claim 1, wherein the pneumatically actuated valve is a butterfly valve.

7. The pneumatically actuated valve of claim 1, wherein the pneumatic actuator comprises:
   an actuator housing connected to the valve housing;
   a piston positioned in the actuator housing and connected to a shaft for rotating the valve disc; and
   a torque motor connected to the piston and to the pitot tube, wherein the torque motor actuates the piston to rotate the valve disc using gas supplied from the pitot tube.

8. A bleed system for a gas turbine engine comprising:
   a bleed passage connected to a compressor section of the gas turbine engine; and
   a bleed valve connected to the bleed passage for controlling fluid flow through the bleed passage, the bleed valve comprising:
      a valve body comprising:
         a valve housing defining a flow passage having a flow passage diameter;
         a valve disc positioned in the valve housing; and
         a shaft connected to the valve disc;
      a pneumatic actuator connected to the shaft for rotating the valve disc in the valve housing; and
      a pitot tube connected to the pneumatic actuator and having a tip extending into the flow passage of the valve housing upstream of the valve disc, wherein the tip has an inlet orifice angled toward a downstream flow direction and is spaced apart from the valve housing by at least 1/20 of the flow passage diameter, and wherein the pitot tube has a body bent away from the valve disc so that the tip is radially offset from the valve disc when the valve disc is in an open position, and is configured so that the tip is substantially free of downstream obstructions for a distance equal to at least 1/2 of the flow passage diameter when the valve disc is in the open position.

9. The bleed system of claim 8, wherein the tip is substantially free of downstream obstructions for a distance equal to at least three times the flow passage diameter when the valve disc is in an open position.

10. The bleed system valve of claim 8, wherein the tip is substantially free of downstream obstructions for a distance equal to at least ten times the flow passage diameter when the valve disc is in an open position.

11. The bleed system of claim 8, wherein the tip is spaced apart from the valve housing by at least 1/10 of the flow passage diameter.

12. The bleed system of claim 8, and further comprising:
   a pressure sensor positioned in the bleed passage downstream of the bleed valve, wherein the pneumatic actuator rotates the valve disc based upon pressure sensed by the pressure sensor.

13. The bleed system of claim 8, wherein the pneumatically actuated valve is a butterfly valve.

14. The bleed system of claim 8, wherein the pneumatic actuator comprises:
   an actuator housing connected to the valve housing;
   a piston positioned in the actuator housing and connected to the shaft for rotating the valve disc; and
   a torque motor connected to the piston and to the pitot tube, wherein the torque motor actuates the piston to rotate the valve disc using gas supplied from the pitot tube.

15. A bleed system for a gas turbine engine comprising:
   a bleed passage connected to a compressor section of the gas turbine engine; and
   a bleed valve connected to the bleed passage for controlling fluid flow through the bleed passage, the bleed valve comprising:
      a valve body comprising:
         a valve housing defining a flow passage;
         a valve disc positioned in the valve housing; and
         a shaft connected to the valve disc;
      a pneumatic actuator connected to the shaft for rotating the valve disc in the valve housing; and
      a pitot tube connected to the pneumatic actuator and having a body and a tip, the tip extending into the flow passage of the valve housing upstream of the valve disc and having an inlet orifice angled toward a downstream flow direction, and the body being bent away from the valve disc so that the tip is radially offset from the valve disc when the valve disc in an open position and configured so that the tip is positioned in a portion of the flow passage with a substantially highest velocity flow stream.

16. A method for configuring a bleed valve, the method comprising:
   connecting a pitot tube to a pneumatic actuator of the bleed valve, the bleed valve having a flow passage to receive bleed air from a compressor section of a gas turbine engine; and
   positioning a tip of the pitot tube upstream of a valve disc of the bleed valve, with an inlet orifice of the tip being angled toward a downstream flow direction, radially offset from the valve disc of the bleed valve in an open position thereof, in a portion of the flow passage with a substantially highest velocity flow stream.

17. The method of claim 16, and further comprising:
   spacing the tip of the pitot tube apart from a housing of the bleed valve by at least 1/20 of a flow passage diameter; and
   positioning the tip of the pitot tube to be substantially free of downstream obstructions for a distance equal to at least 1/2 of the flow passage diameter when the valve is in the open position.

\* \* \* \* \*